United States Patent [19]
Berman et al.

[11] Patent Number: 5,101,926
[45] Date of Patent: Apr. 7, 1992

[54] MENTAL INCOMPETENCY SAFETY SYSTEM FOR OPERATING A VEHICLE

[76] Inventors: Carol W. Berman; Martin A. Farber, both of 348 E. 50th St., New York, N.Y. 10022

[21] Appl. No.: 583,179

[22] Filed: Sep. 14, 1990

[51] Int. Cl.$^5$ .......................................... B60K 21/00
[52] U.S. Cl. .................................. 180/272; 180/287
[58] Field of Search ............... 180/272, 287; 340/576; 192/21.5

[56] References Cited

U.S. PATENT DOCUMENTS

| | | | |
|---|---|---|---|
| 3,755,776 | 8/1973 | Kotras | 180/272 |
| 3,886,540 | 5/1975 | Sussman et al. | 180/272 |
| 4,867,287 | 9/1989 | Hayashi | 192/21.5 |

FOREIGN PATENT DOCUMENTS

| | | | |
|---|---|---|---|
| 0226447 | 9/1989 | Japan | 180/272 |
| 2143978 | 2/1985 | United Kingdom | 180/272 |

Primary Examiner—Kenneth R. Rice

[57] ABSTRACT

A control system comprises a memory for storing questions and answers determinative of mental incompetency of a potential driver to drive. A display displays the questions. A keyboard is provided for the driver to answer the questions. The control system determines if the correct number of answers is lower than a predetermined value thereby indicating mental incompetency of the potential driver to drive. In such event a signal is provided so that the engine is prevented from starting or a clutch is prevented from engaging so the vehicle cannot be placed into an operational driving condition.

20 Claims, 3 Drawing Sheets

MENTAL INCOMPETENCY SAFETY SYSTEM FOR OPERATING A VEHICLE

FIELD AND BACKGROUND OF THE INVENTION

The present invention relates to a safety system for detecting a driver's competency or mental incompetency to drive a vehicle and for preventing driving of the vehicle.

People who are incompetent to drive, such as for example, drunken or drugged drivers, Alzheimer's disease people and other individuals mentally incompetent to drive are causing accidents every day. The elimination of mentally incompetent drivers will save millions of lives.

In New York City alone cocaine was found in one out of five drivers killed in vehicle accidents from 1984 through 1987 according to a report in the Journal of the American Medical Association. These and other lives could have been saved if these drivers were prevented from driving.

In the state of California physicians and other professionals are required to report Alzheimer's disease and other related disorders and any chronic confused state unresponsive to treatment to their county or city health departments under Section 410, Health and Safety Code Sec. 2500 and 2572, Title 17, California Code of Regulations. These health departments forward the reports to their department of motor vehicles. This requirement interferes with the basic physician-patient privilege of confidentiality and may cause such patients in need of medical attention to forego medical assistance, so it leaves something to be desired. This law is one attempt to protect those afflicted with Alzheimer's disease and with similar disorders from themselves and to protect others from injury from these people when driving.

The Supreme Court has upheld state police power laws providing random stop and frisk checks for alcohol and drugs. This law also erodes citizens' basic constitutional rights against search and seizure in the absence of probable cause.

SUMMARY OF THE INVENTION

The inventors have recognized that there is no adequate system where a safety system in the vehicle diagnoses the driver's mental state and determines whether or not the driver is mentally competent to drive.

It is an object of the invention to provide a method and system where a vehicle safety system diagnoses the driver's mental state and decides whether or not the driver is mentally competent to drive.

It is an object of the present invention to provide a safety system for a vehicle having an automotive engine which detects a drive's mental incompetency, whereupon the engine is prevented from starting or the transmission is prevented from being engaged, thereby avoiding dangerous driving of a motor vehicle by a mentally incompetent person.

According to the present invention a safety system and method are provided for a motor vehicle having an engine with an ignition for starting the engine, and a transmission, comprising means for detecting mental incompetency of the driver and for producing an incompetency signal representing detected mental incompetency, and stopping means responsive to the incompetency signal for preventing starting of the engine or engagement of the transmission.

Such a method and system gives the driver a basic mental competency test. If the driver does not pass the exam, then the vehicle can not be driven. Either the engine will not start or the transmission remains disengaged in neutral. The present invention provides a vehicle driver mental competency test and a method and safety system for enabling operation of the vehicle only when the driver is mentally competent to drive.

The present invention can eliminate the controversial need for reporting of patients with mental incompetency disabilities as Alzheimer's disease and other related disorders and any chronic confusional state unresponsive to treatment. This could also eliminate interference with the physician-patient confidentiality. Since the mentally incompetent, e.g. Alzheimer's individual, would not pass this mental competency test, this person would not be able to drive the vehicle. Also, there would be reduction in the need for random police stop and search of car drivers.

By this invention the savings of lives and property would be enormous if those mentally incompetent to drive would not be able to drive vehicles at all.

The present invention operates in the following manner. The potential driver sits in the usual position in the drive's seat. The potential driver then puts the key in the ignition which activates the mental competency test which includes a display located on a panel on the dashboard. The following questions (listed by mental competency question number $N = 1, 2 \ldots 6$) displayed in a sequence on the display may be asked of the driver by the test:

1. What time is this? A clock with two hands set to a time is displayed on the display. A different time is displayed by the clock each time the driver inserts the key. The displayed time is not necessarily the true time. The driver must answer the question by entering the displayed time on a keyboard.

2. If you have twenty nickels and are charged 85¢ for a soda how many nickels are left after you pay? (Other simple math problems used in mental competency tests may be used.)

3. Three objects are listed on the display screen for a predetermined number of seconds, such as: an apple, a book, a comb. The driver is asked to remember these items when requested near the end of the test and select them from a list. (For each test a different set of items is provided.)

4. and 5. A number such as 731562 is flashed on screen for 10 seconds and then disappears. The driver is asked to repeat the numbers forward and then backwards on the keyboard.

6. Which figure is different? (Triplets of similar figures with only one variation in each triplet are shown). The driver must pick out the dissimilar one and enter it by the keyboard.

After the last mental competency question the computer scores the answers. A score of correct answers under a certain level is presumptive of a mental state of incompetency to drive, either due to intoxication, or other substance abuse, or other cognitive impairment such as Alzheimer's disease or other related disorders, or chronic confused states. In such case of a low score the computer sends an incompetency signal which prevents the engine from starting or the transmission which includes a clutch from engaging.

This prevents a mentally incompetent driver from driving the vehicle, preventing accidents which can occur with the vehicle not being adequately controlled by a mentally incompetent driver.

The present invention prevents this by not allowing the vehicle to be driven when the driver does not achieve a score indicative of mental competency to drive.

BRIEF DESCRIPTION OF THE DRAWINGS

The above and other objects and features of this invention will become understood from the following description with reference to the accompanying drawings of which.

DETAILED DESCRIPTION OF THE PREFERRED EMBODIMENTS

Figure 1:
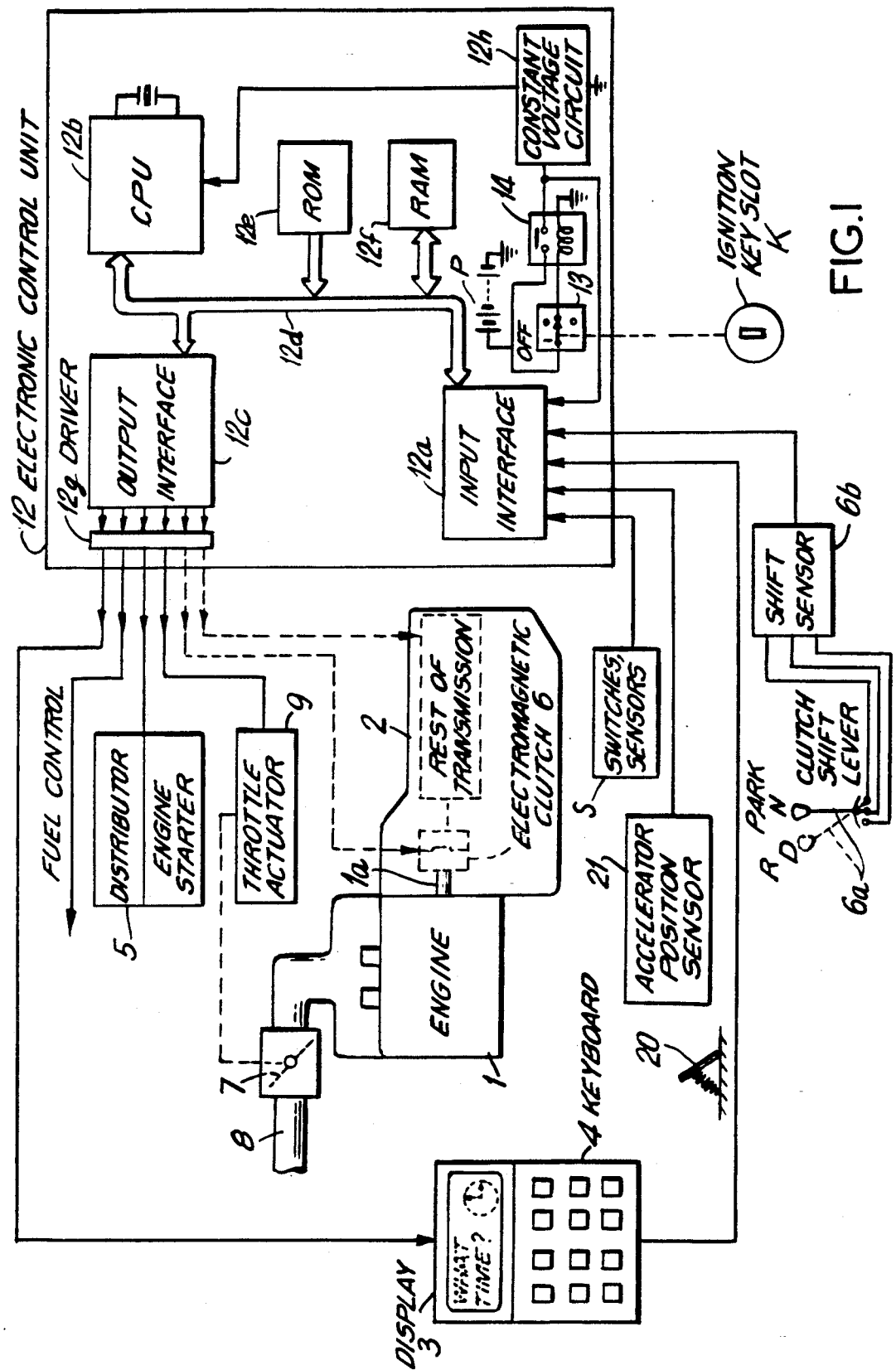
FIG. 1 is a schematic diagram showing a system to which the present invention is applied.

Referring to FIG. 1, an engine 1 for a motor vehicle is provided with a distributor 5 which is part of an ignition system for the engine 1. Power of the engine 1 from its crankshaft 1a is transmitted through a transmission 2 to driving wheels (not shown) of the vehicle. The transmission 2 includes a clutch 6 and the rest of the transmission may be a continuously variable transmission (CVT) comprising controllable variable width conical drive and driven pulleys controlled by hydraulic cylinders and a hydraulic control circuit and a belt connecting the pulleys, or a conventional gear transmission. The clutch 6 may be an electromagnetic clutch such as a powder clutch. The clutch 6 is normally engaged, when a shift lever 6a is shifted from the PARK or neutral (N) position to the drive (D) or reverse (R) positions by a corresponding signal from the shift sensor 6b in dependency on other engine, vehicle or transmission operating conditions. An intake passage 8 of the engine 1 has a throttle valve 7. A throttle valve 7 in an intake passage 8 of the engine 1 is operated by the human driver, e.g. by an accelerator pedal 20, an accelerator pedal position sensor 21, and by a throttle actuator 9 such as a stepper motor in dependency on operating conditions. Various switches and sensors S (not shown in detail) can be provided for sensing and providing corresponding signals of various operating conditions of the engine and transmission, and other vehicle conditions including pulley, vehicle and engine speed, acceleration, intake air quantity, exhaust gas oxygen $O_2$ content, throttle valve position, idling, neutral position, etc. for controlling the engine 1, and transmission 2 including the clutch 6 via an electronic control unit 12 of an electronic control system.

When the vehicle is being driven, the switches and sensors produce the corresponding signals dependent on the sensed conditions, which are applied to the control unit 12 and stored in a RAM 12f after processing of data in accordance with the program stored in a ROM 12e of the control unit 12. Dependent on the signals and programs in the control unit, the control unit 12 via a driver 12g connected to an output interface 12c of the control unit 12 supplies driving or control signals to the throttle actuator 9, clutch 6, the rest of the transmission 2 or to solenoid valves in the hydraulic control circuit for the CVT, an engine fuel pump and injectors (not shown) if necessary or an air-fuel mixture controller and to other actuators such as e.g. for fuel-vapor emission control, and an exhaust gas recirculation system (not shown), for controlling various components of the engine 1 as is well known in the art.

The control unit 12 comprises an input interface 12a applied with the operating condition sensor signals from the various sensors. Some of the signals, for example, a signal from an engine coolant temperature sensor (not shown) is supplied to the input interface 12a through an A/D converter (not shown).

A control processor unit (CPU) 12b processes these input signals received through a data bus 12d and produces output driving and control signals through an output interface 12c and the driver 12g. Some of these output signals are applied to the display 3, the throttle actuator 9, the distributor 5 of the ignition system, ignition coils, and to the other actuators (not shown) such as for example an air-fuel ratio controlling carburator, fuel pump, or fuel injectors for fuel control. The input interface 12a, CPU 12b, the output interface 12c, the read only memory (ROM) 12e, and the random access memory (RAM) 12f are connected to each other through the data bus 12d. Programs and data for controlling the engine and transmission are stored in the ROM 12e. The control unit 12 also is provided with a power source P and a constant voltage circuit 12h which is connected to the CPU 12b. An ignition key switch 13 is connected between the power source P and the constant voltage circuit 12h to supply power to the CPU 12b, the input and output interfaces 12a, 12c and the driver 12g via a relay 14 when the ignition key is turned in ignition key slot K.

A display 3 which may be liquid crystal display or other visual display is connected to the output interface 12c and a keyboard 4 is connected to the display and the input interface 12a. The keyboard 4 and display 3 are conveniently mounted on the dashboard.

Figure 2:
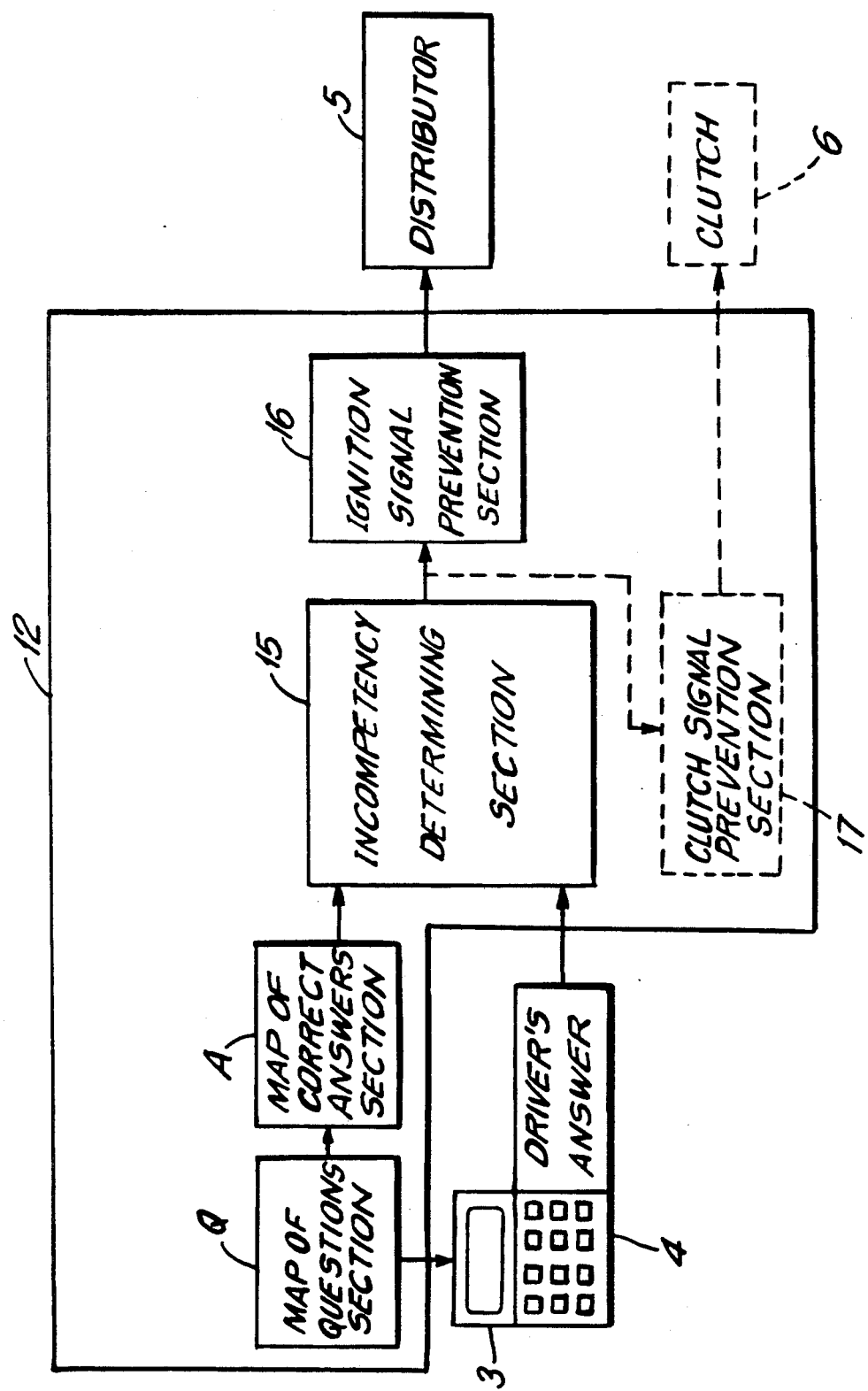
FIG. 2 is a block diagram of a control unit of the system showing a first embodiment of the invention and a second embodiment in dashed lines.

Referring also to FIG. 2 a block diagram representation of the mental incompetency safety program in the computer in the control unit 12 which controls operation of the engine or engagement of the clutch 6 of the transmission 2, the block diagram shows the means to detect mental incompetency of a potential driver.

Upon turning on the ignition by a key in the ignition key slot K the display 3 displays a first mental competency question (from the MAP of mental competency questions section Q stored in the ROM 12e) to be answered by the potential driver before the engine starts or the clutch 6 of the transmission can be engaged. The driver answers the question by pressing keys on the keyboard 4 and entering them, thereby providing an answer to the first question displayed on the display 3. Several other mental competency questions are sequentially also displayed on the display 3 which the potential driver must answer via the keyboard 4. The questions are designed to be indicative of mental competency to drive as recognized by psychological and medical practice and as may be in accordance with state laws. Various tests and sets of such questions exist and professionals such as psychiatrists and psychologists are are presently knowledgeable of questions which clinically are determinative of mental competency to operate a vehicle. These questions and the correct answers are stored in the ROM 12e (FIG. 1).

The drive's answers via output signals from the keyboard 4, and the actual correct answer signal from the MAP of correct answers section A stored in the ROM 12e are applied to a mental incompetency determining section 15. Each answer to each question is compared with the correct answer from the map in the correct answers section A and a counter (not shown) in the section 15 counts up the correct number of answers to provide a total score. In the normal mental competent state of a driver, the total score of the several questions must be equal or greater than a predetermined minimum value P. However, when the driver is incompetent to drive the total score of the drive's answers is below the predetermined score value e.g. P=6. When the total score is less than the predetermined score, the incompetency determining section 15 produces an incompetency signal. In this case, e.g. where the predetermined score P is six, i.e., the incompetency signal is produced whenever the total score signal is less than six. The incompetency signal is applied in one embodiment of the invention to an ignition signal prevention section 16 which operates to prevent supplying an ignition signal to the distributor 17 of the ignition system, or the incompetency signal is applied in another embodiment of the invention to a clutch signal prevention section 17 which operates to prevent supplying a clutch signal to the clutch 6 for engaging the clutch of the transmission, thereby preventing the engine from starting and the vehicle from driving. If, on the other hand, the total score is at least six no incompetency signal is provided, and the ignition signal prevention or the clutch signal prevention does not occur, and the ignition signal is supplied to start the engine, and there is no disablement in engaging the clutch 6 of the transmission to drive the vehicle.

Thereupon, the vehicle can be driven by the driver. In addition, output signals from the other operational sensors are supplied to provide an automatic electronic control of the engine and transmission. Desired control signal providing sections (not shown) in the control unit 12 provide control signals in accordance with the sensor output signals from relationships stored in the ROM 12e or by various calculations for actuating the throttle actuator 9, and air-fuel ratio control or fuel injection for the engine and transmission 2 according to actual and desired operating conditions.

Figure 3:
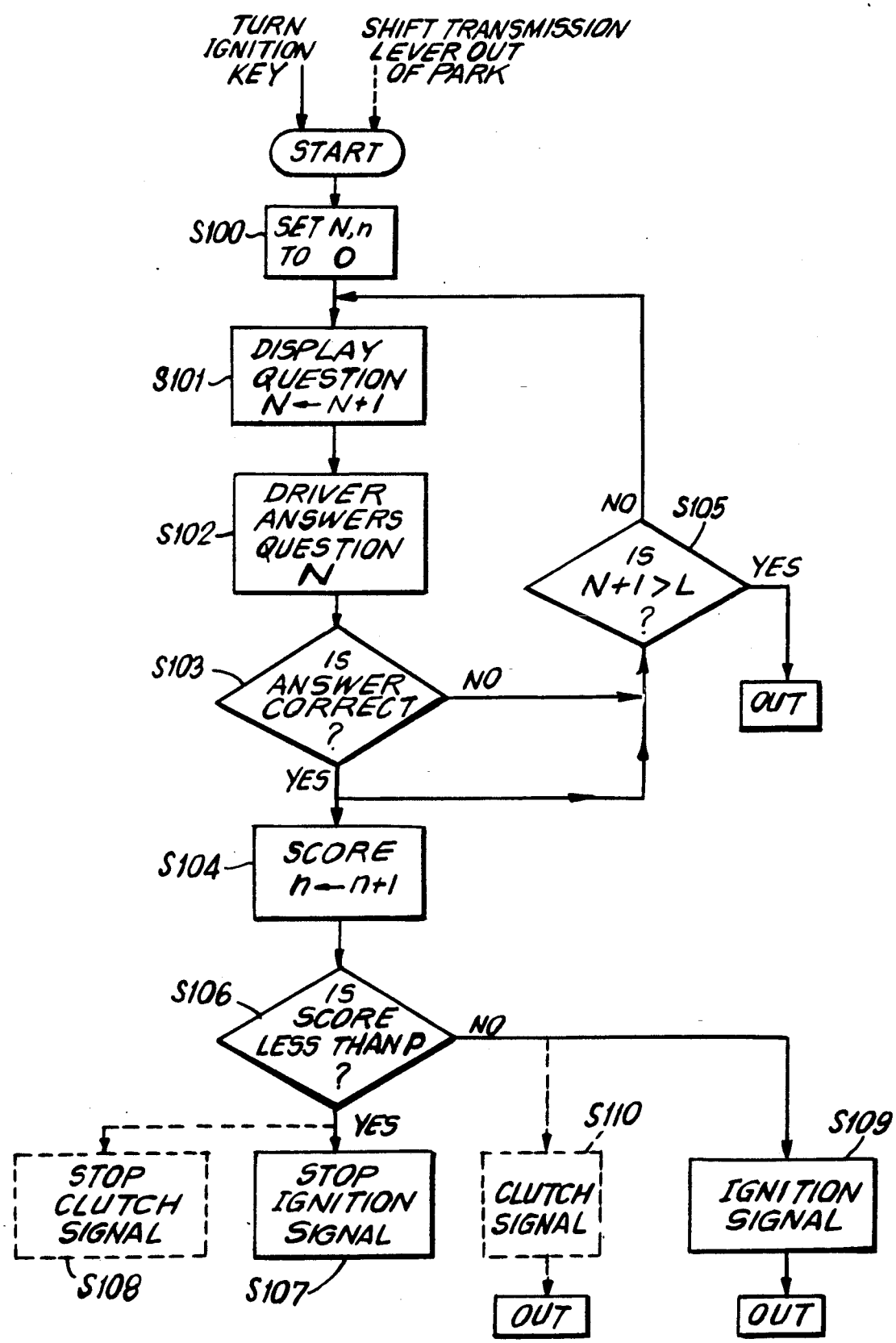
FIG. 3 is a flowchart showing operation of the present invention with the second embodiment again illustrated in dashed lines.

FIG. 3 shows the operation of the control unit 12 for the safety control of the present invention.

At a step S100, after the ignition key is turned (or the transmission is attempted to be shifted out of the PARK position), power from the power source P is sent to the constant voltage circuit 12h, initialization of the control unit 12 is performed, and the question number N and the score n are set to 0. At step S101, the question number N=0 is increased by 1 and the first question (now N=1) is fetched from the MAP Q in the ROM 12e and displayed on the display 3. At a step S102, the driver inputs an answer to the first question on the keyboard 4. At a step S103, it is determined whether the drive's answer to question N=1 is correct or not. If the drive's answer is correct, the program goes to the step S104 where 1 is added to the score n. If the drive's answer was incorrect nothing is added to the score and the score remains the same.

At a step S106 it is determined if the score is smaller than a predetermined minimum value (P). If it is the program proceeds to a step S107 where the ignition signal is prevented keeping the engine stopped (or the program proceeds to a step S108 where the clutch 6 of the transmission is kept disengaged).

At a step S105 it is determined if the present question N number plus 1 is greater than the last question number (L) of the set of questions to be asked. If the step S105 determines that the present question (question number N) which was just answered plus 1 is not greater than the last question number (L) to be answered, the program goes back to step S101, where the present question number N=1 is increased by 1 to become N=2. At step S101, now the program repeats with the second question (N+1=2) being displayed. The program repeats with the second question through the steps S101-S106. The question score is increased by 1 at S104 if the answer to the second question is correct. Steps S107 or S108 occur. The program then returns to S101 for the next question and the above-described program repeats with the third question until the last question N=L or steps S109 or S110 occurs.

If the total score at any time is determined to be equal to or greater than the predetermined minimum value P at step S106, then the ignition signal at step S109 or a clutch signal at step S110 is generated so the engine can start or the clutch 6 of the transmission can be engaged. The program then is terminated. If step S105 determines that the present question number N is the last question number L (i.e., N+1>L) then the program also ends.

If the potential driver does not answer any question or stops answering the questions, before a mental competent score is reached, the step S106 determines that the score is less than P and the vehicle can not be started.

In accordance with the present invention, mental incompetency is detected by a low score and the engine is prevented from starting or the transmission is prevented from shifting out of park or neutral. Accordingly, if the driver is incompetent, the driver is prevented from driving.

Every time the engine is stopped or the transmission is shifted to PARK, the set-of-questions routine starting from Start of the program takes place upon each attempt to turn on the ignition or to shift the transmission out of PARK into another position before the vehicle can be driven.

The invention also may be applied to any type of vehicle other than motor vehicles or aircraft having an engine, whether the engine is automatically controlled during driving by sensors and an electronic control unit or not. Different mental competency questions which per se are not the subject of the present invention may be provided for different mental competency criteria depending on the vehicle such as a motor vehicle or aircraft to be operated.

In the second embodiment of steps S108, S110 and section 17, the engine 1 would start since it is not prevented from starting when the ignition key is turned since section 16 and steps S107, S109 are not present, but the clutch 6 could not engage until a mentally competent score is reached. Other devices of the vehicle may be used instead of the ignition and the clutch to prevent driving at a mental incompetent score, such as only for example, a vehicle parking brake.

While the presently preferred embodiments of the present invention have been shown and described, it is to be understood that this disclosure is for the purpose of illustration and that various changes and modifications may be made without departing from the scope of the invention as set forth in the appended claims.

We claim:

1. A mental incompetency safety system for preventing operation of a vehicle by a potential operator who is mentally incompetent, the vehicle having a device for permitting operation of the vehicle only when the device is in an operating condition, comprising:
a control system for controlling said device;
said control system comprising:
a display, a keyboard, and a control unit connected to said keyboard and to said display,
said control unit comprising memory means for storing mental competency questions displayable on said display and correct answers to said questions indicative of operator mental competency to operate the vehicle,
said keyboard for inputing answers of the potential operator to at least one of the mental competency questions displayed on the display, and
said control unit comprising means for comparing the potential operator's answers, independent of answering within a predetermined time which is indicative of physiological responsiveness, with the correct answers, scoring correct potential operator's answers, and comparing potential operator's score with a predetermined minimum score determinative of mental competency to operate the vehicle for providing an incompetency signal upon a score under said predetermined minimum score, and
means responsive to the incompetency signal for preventing operation of said device by the potential operator.

2. The system according to claim 1, wherein
said device is an engine of the vehicle and said preventing means is responsive to the incompetency signal for preventing starting of said engine.

3. The system according to claim 2, wherein
said control unit displays at least one of said questions to be answered each time after the engine is stopped and an ignition of the engine is attempted to be turned on.

4. The system according to claim 1, wherein
said device is a transmission of the vehicle and preventing means is responsive to the incompetency signal for preventing engagement of said transmission.

5. The system according to claim 4, wherein
said device is a clutch of the transmission.

6. The system according to claim 5, wherein
said clutch is an electromagnetic clutch.

7. The system according to claim 6, wherein
said clutch is an electromagnetic powder clutch.

8. The system according to claim 2, wherein
said control unit displays at least one of said questions to be answered each time the transmission is attempted to be shifted out of PARK.

9. The system according to claim 1, wherein
said device is a parking brake and said preventing means is responsive to the incompetency signal for preventing release of the parking brake.

10. The system according to claim 1, wherein
said memory means displays said at least one question which is different each time said device is attempted to be operated.

11. The system according to claim 1, wherein
said memory means stores a plurality of the questions displayable on said display in sequence to be answered independent of time by the potential operator each time the device is attempted to be operated by the potential operator.

12. The system according to claim 11, wherein
said memory means displays a different set of the plurality of questions each time said device is attempted to be operated by the potential operator.

13. The system according to claim 12, wherein
the display displays a plurality of the questions in sequence, and the potential driver answers the questions in sequence, and the steps of comparing and scoring compare and score the correct potential driver's answers to the plurality of questions.

14. A method for preventing operation of a vehicle by a potential operator who is mentally incompetent, the vehicle having a device for driving the vehicle only when the device is in an operating condition, comprising the steps of:
displaying at least one mental competency question to be answered on a display when the vehicle is attempted to be operated by the potential operator,
answering the at least one mental competency question by the potential operator by keying an answer to the at least one mental competency question on a keyboard, and
comparing the potential operator's answer, independent of answering within a predetermined time which is indicative of physiological responsiveness, with a correct answer indicative of mental competency to operate the vehicle, scoring the potential operator's answer, and comparing the potential operator's score with a predetermined minimum score determinative of mental competency to operate the vehicle for providing an incompetency signal upon a score under said predetermined minimum score, and
preventing the device from being placed into its operating condition when the incompetency signal occurs.

15. The method according to claim 3, wherein
said question is: what time is this?, wherein a clock with two hands set to a time is displayed on the display.

16. The method according to claim 3, wherein
said question is a question of making change of money.

17. The method according to claim 3, wherein
said question is a math question.

18. The method according to claim 3, wherein
said question is wherein three objects are listed on the display and thereafter the potential operator is later asked to remember these items independent of time.

19. The method according to claim 14, wherein
said question is triplets of similar figures with only one variation in each triplet are shown and potential operator must pick out the dissimilar one and enter it by the keyboard independent of time.

20. A method for preventing operation of a vehicle by a potential operator who is mentally incompetent, the vehicle having a device for driving the vehicle only when the device is in an operating condition, comprising the steps of:
displaying at least one mental competency question to be answered on a display when the vehicle is attempted to be operated by the potential operator,
answering the at least one mental competency question by the potential operator by keying an answer to the at least one mental competency question on a keyboard, and comparing the potential operator's answer with a correct answer indicative of mental competency to operate the vehicle, scoring the potential operator's answer, and comparing the potential operator's score with a predetermined minimum score determinative of mental competency to operate the vehicle for providing an incompetency signal upon a score under said predetermined minimum score, and preventing the device from being placed into its operating condition when the incompetency signal occurs, and said question is wherein a multi-digit number is flashed on the display for a while and then disappears, and the potential operator is asked to repeat the numbers forward and/or then backwards on the keyboard independent of a predetermined time which predetermined time is indicative of physiological responsiveness.

* * * * *